J. T. DICKINSON.
RIM FOR PNEUMATIC TIRES.
APPLICATION FILED JULY 29, 1921.
1,413,834.
Patented Apr. 25, 1922.
2 SHEETS—SHEET 1.
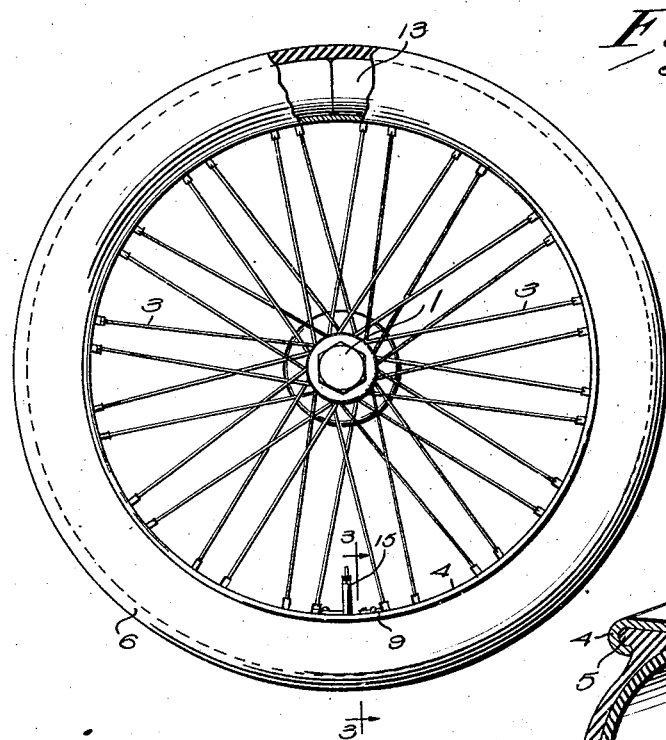
Fig.1.
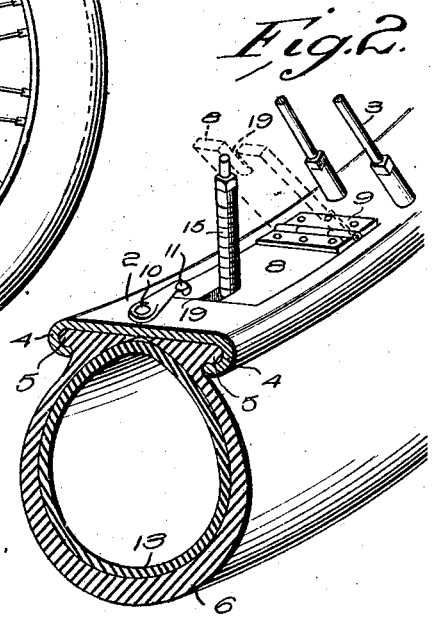
Fig.2.
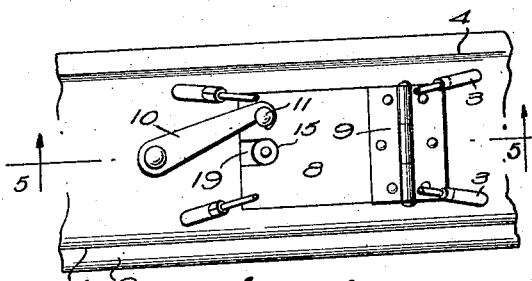
Fig.3.
Fig.4.
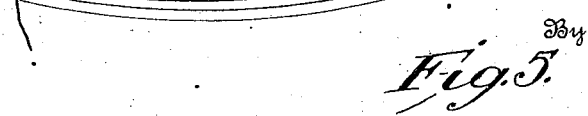
Fig.5.
Inventor
J. T. DICKINSON J. T. DICKINSON.
RIM FOR PNEUMATIC TIRES.
APPLICATION FILED JULY 29, 1921.
1,413,834.
Patented Apr. 25, 1922.
2 SHEETS—SHEET 2.
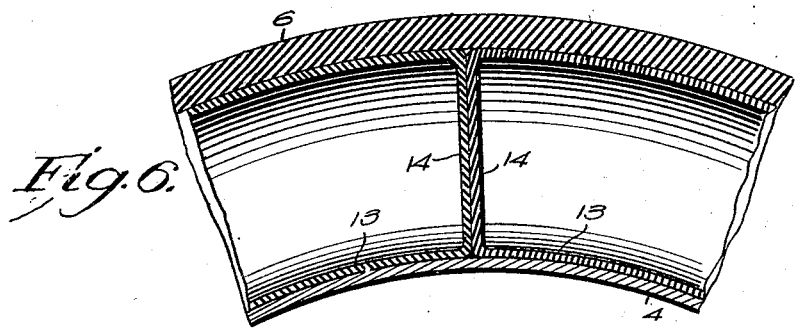
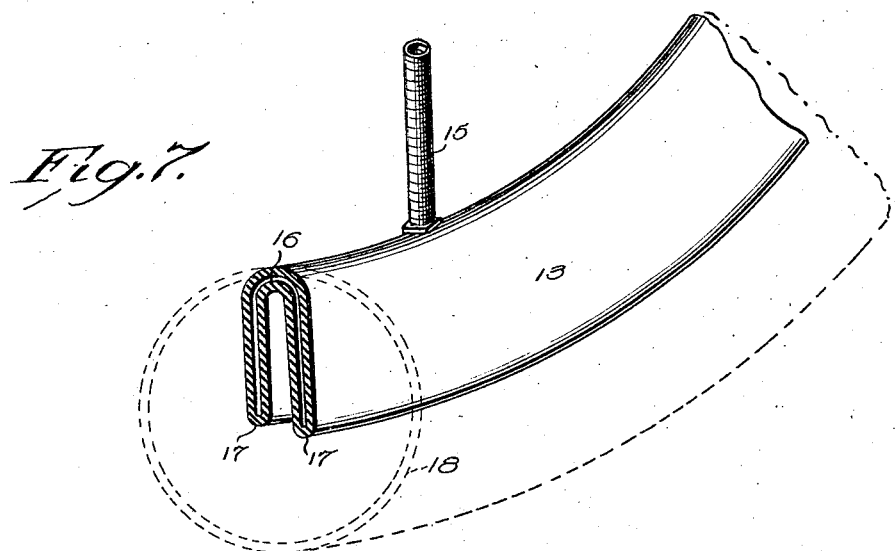
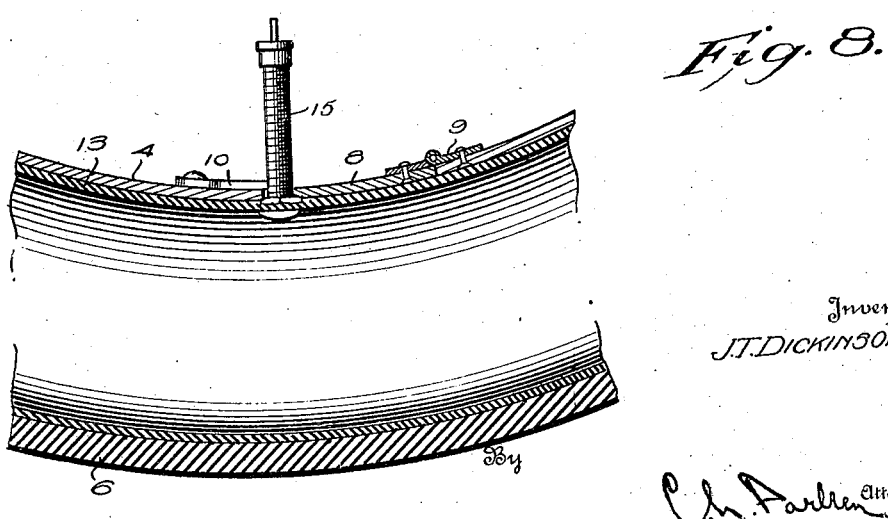
Inventor
J.T. DICKINSON

UNITED STATES PATENT OFFICE.

JOHN THOMAS DICKINSON, OF DANVILLE, ILLINOIS.

RIM FOR PNEUMATIC TIRES.

1,413,834.   Specification of Letters Patent.   Patented Apr. 25, 1922.

Application filed July 29, 1921. Serial No. 488,394.

*To all whom it may concern:*

Be it known that I, JOHN T. DICKINSON, a citizen of the United States, residing at Danville, in the county of Vermilion and State of Illinois, have invented certain new and useful Improvements in Rims for Pneumatic Tires, of which the following is a specification.

This invention relates to rim for pneumatic tires and tubes therefor, and more particularly to a rim and tire casing in which a tube may be inserted without removing the casing from the rim.

An object of the invention is the provision of a rim adapted to receive a tube in which the ends are closed but not joined to permit the tube to be inserted in the casing while the casing is on the rim.

A further object is the provision of a tube of reduced cross section, when deflated, to facilitate introduction of the tube into the casing.

A further object is the provision of a rim having an opening through which the tube may be inserted in the tire.

In the accompanying drawings, I have shown one embodiment of the invention. In this showing:

Figure 1 is a side elevation of a wheel showing the invention applied, parts being shown in section, Figure 2 is a detail perspective view, Figure 3 is a transverse sectional view on line 3—3 of Figure 1, Figure 4 is a plan view of a portion of a rim, Figure 5 is a detail sectional view on line 5—5 of Figure 4, Figure 6 is a detail sectional view of a portion of the casing and tube, Figure 7 is a detail perspective view of a portion of the tube, and, Figure 8 is a detail sectional view of the rim, casing, and tube showing the position of the valve stem.

Referring to the drawings, the reference numeral 1 designates the hub of a wheel having a rim 2 connected thereto by means of spokes 3. The rim is provided with flanges 4, adapted to engage beads 5 formed on the sides of a tire casing 6. The construction heretofore described is the usual construction and forms no part of the invention, except in the combination claimed.

In the present disclosure, I have illustrated a wire wheel in which the rim of the wheel is provided with the tire receiving flanges. The rim is further provided with an opening 7, adapted to be covered by a door 8, connected to the rim by a hinge 9. As shown, a catch 10, is arranged opposite the hinge and is adapted to engage a pin 11 carried by the door to retain it in closed position. When a clincher type tire is employed, the beads of the tire are cut away, as at 12, (see Figure 3) for a distance equal to the size of the door, and this cut-away portion is adapted to be arranged beneath the door to permit insertion of a tube.

The tube 13, forming a part of the invention, is provided with ends 14 constructed in any suitable manner and provided with suitable reenforcement. The tube may thus be laid out in a straight line, or it may be arranged within the tire as shown in Figure 1. The usual valve stem 15 is arranged intermediate the ends of the tube.

Referring to Figure 7 of the drawings, when the tube is manufactured, it is provided with a circumferential crease 16 at a point diametrically opposite the valve stem and with a pair of creases 17, arranged between the crease 16 and the valve stem. When deflated, the tube will occupy the position shown in full lines in Figure 7 of the drawings, thus reducing its cross-section and facilitating insertion of the tube within the casing. When the tube is inflated, it assumes a circular cross-section, as shown at 18 in dotted lines. The free edge of the door is provided with a slot 19 for the reception of the valve stem.

In operation, when a tube is to be changed, the catch 10 is unfastened and the door opened. The old tube is then withdrawn from the casing, and a new tube inserted by feeding the ends of the tube through the door in opposite directions. When the tube has been entirely inserted, it may be inflated, and the ends 14 will assume the position shown in Figures 1 to 6 of the drawings.

In the present disclosure, I have illustrated a wire wheel and a clincher tire. Where straight side tires are employed, it is unnecessary to cut out portions of the bead, as at 12, as in normal position, the beads of the tire are spaced sufficiently to permit the tube to be inserted through the door. When a demountable rim is employed, the rim may be provided with an opening and the tube removed after the rim has been removed from the wheel, or registering openings may be formed in both the felly and the rim. In an ordinary wooden wheel of the clincher rim type, the construction is of course, the same as in the wire wheel construction.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A rim for pneumatic tires, said rim being provided with means for retaining a tire casing thereon and being further provided with an opening for the insertion of a tire tube, a hinged door closing said opening, the free edge of the door being provided with a recess for the reception of the valve stem of the tire tube, and means for retaining said door in closed position.

2. A rim for pneumatic tires, said rim being provided with means for retaining a tire casing thereon and being further provided with an opening for the insertion of a tire tube, a hinged door closing said opening, the free edge of the door being provided with a recess for the reception of the valve stem of the tire tube, a pin carried by said door and arranged near the free edge, said pin being provided with an enlarged head, and a locking member pivotally mounted on said rim and adapted to engage said pin beneath said head.

In testimony whereof I affix my signature in presence of two witnesses.

JOHN THOMAS DICKINSON.

Witnesses:
  WM. B. MURRAY,
  J. A. DONALDSON.